United States Patent
Chen et al.

(10) Patent No.: US 11,190,301 B2
(45) Date of Patent: Nov. 30, 2021

(54) METHOD AND DEVICE FOR SETTING OUT-OF-ORDER VALUE OF NETWORK

(71) Applicant: Wangsu Science & Technology Co., Ltd., Shanghai (CN)

(72) Inventors: Shiguang Chen, Shanghai (CN); Pengcheng Yang, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 28 days.

(21) Appl. No.: 16/818,787

(22) Filed: Mar. 13, 2020

(65) Prior Publication Data

US 2020/0213041 A1 Jul. 2, 2020

Related U.S. Application Data

(63) Continuation of application No. PCT/CN2018/081742, filed on Apr. 3, 2018.

(30) Foreign Application Priority Data

Dec. 7, 2017 (CN) .......................... 201711287655.1

(51) Int. Cl.
*H04L 1/18* (2006.01)

(52) U.S. Cl.
CPC .......... *H04L 1/1809* (2013.01); *H04L 1/1864* (2013.01); *H04L 1/1896* (2013.01)

(58) Field of Classification Search
CPC .... H04L 1/1809; H04L 1/1864; H04L 1/1896
See application file for complete search history.

(56) References Cited

U.S. PATENT DOCUMENTS

| | | | |
|---|---|---|---|
| 8,819,512 B1 | 8/2014 | Wang et al. | |
| 2008/0089347 A1* | 4/2008 | Phillipi | H04L 43/50 370/400 |
| 2010/0050040 A1* | 2/2010 | Samuels | H04L 67/28 714/749 |

(Continued)

FOREIGN PATENT DOCUMENTS

| | | |
|---|---|---|
| CN | 102664718 A | 9/2012 |
| CN | 105991461 A | 10/2016 |

OTHER PUBLICATIONS

Floyd, et al., An Extension to the Selective Acknowledgement (SACK) Option for TCP, RFC2883, Jul. 2000, 17 pgs. (Year: 2000).*

(Continued)

*Primary Examiner* — Kent Krueger
(74) *Attorney, Agent, or Firm* — USCH Law, PC

(57) ABSTRACT

The present disclosure relates to data transmission technology, in particular to a method and a device for setting an out-of-order value of a network. The method includes: receiving a D-SACK message corresponding to a first data packet of a target data; searching an out-of-order value prediction table stored locally for an out-of-order prediction value of the first data packet, where the out-of-order prediction value is a out-of-order value of a network determined according to a reception status of data packets of the target data when resending the first data packet; and setting a current out-of-order value of the network according to the out-of-order prediction value of the first data packet. By adopting the present disclosure, network transmission resources can be saved.

18 Claims, 4 Drawing Sheets

(56) References Cited

U.S. PATENT DOCUMENTS

2019/0319889 A1* 10/2019 Zhang .................... H04L 43/16

OTHER PUBLICATIONS

Ma, et. al., Improving TCP robustness under reordering network environment, GLOBECOM '04, 2004 (Year: 2004).*
International Search Report, PCT/CN2018/081742, dated Dec. 7, 2017, 4pgs.
Floyd, et al., An Extension to the Selective Acknowledgement (SACK) Option for TCP, Jul. 31, 2000, 17 pgs.
Zhao, et al., Overview of Processing Algorithms for Out-of-Order Packets in the TCP Protocol, Jul. 15, 2010, 4 pgs.
Wangsu Science & Technology Co., Ltd., PCT/CN2018/081742, International Search Report, dated Aug. 20, 2018, 4 pgs.
Ming Zhang, et al., RR-TCP: A Reordering-Robust TCP with DSACK, Proceedings of the 11th IEEE International Conference on Network Protocols, Nov. 4, 2003, 12 pgs.
Wangsu Science and Technology Co., Ltd., Supplementary European Search Report, EP18886701.4, dated Nov. 25, 2020, 9 pgs.
Wangsu Science & Tech., Office Action, CN 201711287655.1, dated Dec. 16, 2019, 9 pgs.

* cited by examiner

METHOD AND DEVICE FOR SETTING
OUT-OF-ORDER VALUE OF NETWORK

CROSS-REFERENCE TO RELATED APPLICATIONS

The present disclosure is a continuation of PCT Patent Application No. PCT/CN2018/081742, filed Apr. 3, 2018, entitled "METHOD AND DEVICE FOR SETTING OUT-OF-ORDER VALUE OF NETWORK", which claims priority to Chinese Patent Application No. 201711287655.1, filed Dec. 7, 2017, each of which is incorporated herein by reference in its entirety.

TECHNICAL FIELD

The present disclosure relates to data transmission technology, and in particular, to a method and a device for setting an out-of-order value of a network.

BACKGROUND

In a process of transmitting data in a wireless network, failure of data transmission may occur due to network or equipment breakdown. As a result, a sending terminal may need to resend the data.

Generally, the sending terminal is preset with an out-of-order value of the network for evaluating a disorder degree of the network. After the sending terminal sends a target data, a receiving terminal will feed back to the sending terminal a selective acknowledgement (SACK) message corresponding to a data packet if the data packet received by the receiving terminal does not arrive in sequence with a sequence number from small to large (for example, data packets 1-10 are sent in sequence, and the data packet 8 is received immediately after the data packet 5 by the receiving terminal). When the number of accumulated SACK messages received by the sending terminal is greater than the out-of-order value of the network above-mentioned, a data packet loss can be considered to have occurred. Further, the sending terminal can reduce a sending window (i.e., reduce an amount of data transmission) and resend a data packet of the target data which the receiving terminal has not received.

In the process of implementing the present disclosure, the inventor found that at least the following problems exist in the existing technology:

In the process of transmitting a target data, an actual disorder degree of the network will become serious due to transmission equipment breakdown or a network load surge. In consequence, a large number of data packets may arrive at a receiving terminal out of order. However, these data packets are not lost and do not require resending. If these data packets are still resent, a large amount of network transmission resources will be consumed.

SUMMARY

In order to solve problems in the existing technology, embodiments of the present disclosure provide a method and a device for setting an out-of-order value of a network. The technical solution according to some embodiments is as follows.

A first aspect of the present disclosure provides a method for setting an out-of-order value of a network. The method includes:

receiving a duplicate SACK (D-SACK) message corresponding to a first data packet of a target data;

searching an out-of-order value prediction table stored locally for an out-of-order prediction value of the first data packet, where the out-of-order prediction value is an out-of-order value of a network determined according to a reception status of data packets of the target data when resending the first data packet; and setting a current out-of-order value of the network according to the out-of-order prediction value of the first data packet.

According to some embodiments, the method further includes:

determining a second data packet with the largest sequence number received by a receiving terminal when resending the first data packet;

calculating the out-of-order prediction value of the first data packet according to a sequence number of the first data packet and the sequence number of the second data packet; and storing the out-of-order prediction value and the sequence number of the first data packet into the out-of-order value prediction table correspondingly.

According to some embodiments, after storing the out-of-order prediction value and the sequence number of the first data packet into the out-of-order value prediction table correspondingly, the method further includes:

deleting the out-of-order prediction value of the first data packet from the out-of-order value prediction table if a SACK message or an ACK message corresponding to the first data packet is not received within a preset time period after resending the first data packet.

According to some embodiments, before storing the out-of-order prediction value and the sequence number of the first data packet into the out-of-order value prediction table correspondingly, the method further includes:

deleting a preset number of out-of-order prediction values stored the longest in the out-of-order value prediction table if a storage space of the out-of-order value prediction table is full.

According to some embodiments, the method further includes:

deleting periodically a preset number of out-of-order prediction values stored the longest in the out-of-order value prediction table.

According to some embodiments, the method further includes:

deleting an out-of-order prediction value stored longer than a preset valid time in the out-of-order value prediction table.

According to some embodiments, storing the out-of-order prediction value and the sequence number of the first data packet into the out-of-order value prediction table correspondingly includes:

storing the out-of-order prediction value and the sequence number of the first data packet into the out-of-order value prediction table correspondingly if the out-of-order prediction value corresponding to the sequence number of the first data packet is not stored in the out-of-order value prediction table;

According to some embodiments, the method further includes:

deleting both the out-of-order prediction value currently calculated and the out-of-order prediction value corresponding to the sequence number of the first data packet in the out-of-order value prediction table if the out-of-order prediction value corresponding to the sequence number of the first data packet is stored already in the out-of-order value prediction table.

A second aspect of the present disclosure provides a device for setting an out-of-order value of a network. According to some embodiments the device includes:

a receiving module, configured to receive a D-SACK message corresponding to a first data packet of a target data;

a searching module, configured to search an out-of-order value prediction table stored locally for an out-of-order prediction value of the first data packet, where the out-of-order prediction value is an out-of-order value of a network determined according to a reception status of data packets of the target data when the first data packet is resent; and a setting module, configured to set a current out-of-order value of the network according to the out-of-order prediction value of the first data packet.

According to some embodiments, the device further includes:

a determining module, configured to determine a second data packet with the largest sequence number received by a receiving terminal when the first data packet is resent;

a calculating module, configured to calculate the out-of-order prediction value of the first data packet according to a sequence number of the first data packet and the sequence number of the second data packet; and a storage module, configured to store the out-of-order prediction value and the sequence number of the first data packet into the out-of-order value prediction table correspondingly.

According to some embodiments, the device further includes:

a first deleting module, configured to delete the out-of-order prediction value of the first data packet from the out-of-order value prediction table if a SACK message or an ACK message corresponding to the first data packet is not received within a preset time period after the first data packet is resent.

According to some embodiments, the device further includes: a second deleting module, configured to delete a preset number of out-of-order prediction values stored the longest in the out-of-order value prediction table if a storage space of the out-of-order value prediction table is full.

According to some embodiments, the device further includes: a third deleting module, configured to delete periodically a preset number of out-of-order prediction values stored the longest in the out-of-order value prediction table.

According to some embodiments, the device further includes: a fourth deleting module, configured to delete an out-of-order prediction value stored longer than a preset valid time in the out-of-order value prediction table.

According to some embodiments, the storage module is configured to:

store the out-of-order prediction value and the sequence number of the first data packet into the out-of-order value prediction table correspondingly if the out-of-order prediction value corresponding to the sequence number of the first data packet is not stored in the out-of-order value prediction table; and delete both the out-of-order prediction value currently calculated and the out-of-order prediction value corresponding to the sequence number of the first data packet in the out-of-order value prediction table if the out-of-order prediction value corresponding to the sequence number of the first data packet is stored already in the out-of-order value prediction table.

A third aspect of the present disclosure provides a sending terminal. The sending terminal according to some embodiments includes a processor and a memory, and the memory stores at least one instruction, at least one program, a code set or an instruction set, where the at least one instruction, the at least one program, the code set or the instruction set are loaded and executed by the processor to perform the method for setting the out-of-order value of the network as described in the first aspect.

A fourth aspect of the present disclosure provides a computer-readable storage medium. The computer-readable storage medium according to some embodiments stores at least one instruction, at least one program, a code set, or an instruction set, where the at least one instruction, the at least one program, the code set or the instruction set are loaded and executed by a processor to perform the method for setting the out-of-order value of the network as described in the first aspect.

The technical solution according to some embodiments has advantages as follows.

According to some embodiments of the present disclosure, the D-SACK message corresponding to the first data packet of the target data is received, the out-of-order value prediction table stored locally is sought for the out-of-order prediction value of the first data packet, where the out-of-order prediction value is the out-of-order value of the network determined according to the reception status of data packets of the target data when resending the first data packet, and the current out-of-order value of the network is set according to the out-of-order prediction value of the first data packet. In this way, the out-of-order prediction value is calculated every time the data packet is resent, and the out-of-order prediction value may be set as the out-of-order value of the network when the D-SACK message is received, so that the out-of-order value of the network may be quickly and accurately updated. On the one hand, resending the data packet falsely may be effectively decreased, and a large amount of network transmission resources may be saved. On the other hand, a situation, in which a transmission efficiency is reduced because of a failure to detect a packet loss in time due to a large out-of-order value of the network, may be avoided.

BRIEF DESCRIPTION OF THE DRAWINGS

In order to illustrate technical solutions in embodiments of the present disclosure more clearly, the drawings for the description of the embodiments will be briefly described below. Obviously, the drawings in the following description are only some embodiments of the present disclosure. For those skilled in the art, other drawings may also be obtained in accordance with the drawings without any inventive effort.

DETAILED DESCRIPTION

In order to clarify objectives, technical solutions and advantages of the present disclosure, embodiments of the present disclosure will be further described in details with reference to the accompanying drawings.

Figure 1:
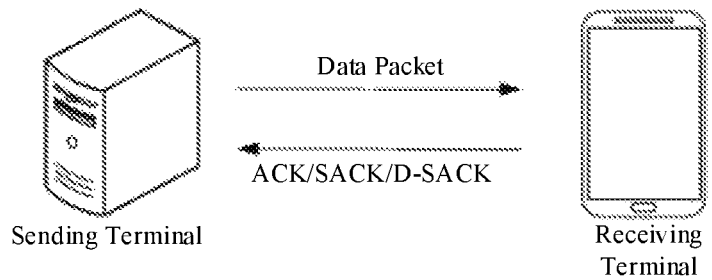
FIG. 1 is a schematic diagram of a scenario for setting an out-of-order value of a network in accordance with an embodiment of the present disclosure.

An embodiment of the present disclosure provides a method for setting an out-of-order value of a network, which may be implemented by a network device. The network device may be a data sending terminal such as a server, a computer and the like. A process of transmitting data may be installed in the network device. The sending terminal may send data to different receiving terminals via different transmission links through the process, and a receiving terminal may be another network device or a terminal device. The network device may include a processor, a memory, and a transceiver. The processor may be configured to perform setting the out-of-order value of the network in the following process. The memory may be configured to store data required and generated in the following process. The transceiver may be configured to receive and send relevant data in the following process. This embodiment is illustrated, for example, with a node server of a content delivery network (CDN) system as the sending terminal and a user terminal device as the receiving terminal. The scenario may be that as shown in FIG. 1, and other situations are similar to this scenario, which will not be described in detail in this implementation.

Figure 2:
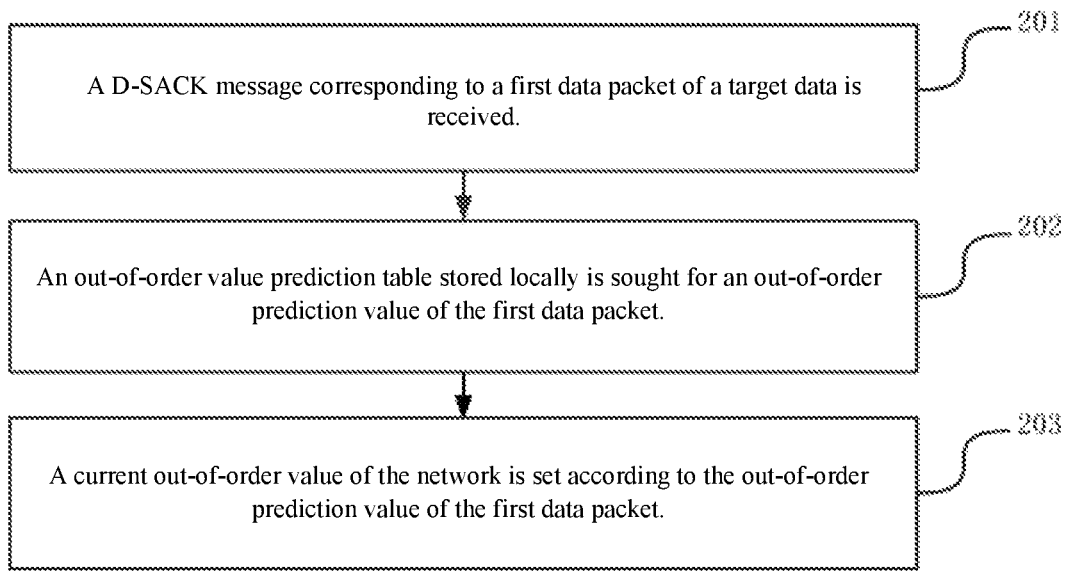
FIG. 2 is a flowchart of a method for setting an out-of-order value of a network in accordance with an embodiment of the present disclosure.

A process shown in FIG. 2 will be described below in detail with reference to a specific embodiment, which may be as follows.

At step 201, a D-SACK message corresponding to a first data packet of a target data is received.

In implementation, when a sending terminal sends the target data to a receiving terminal, a plurality of data packets of the target data may be sent to the receiving terminal via a designated transmission link in sequence according to a sequence number of the data packets. A resending queue of the target data is generated at the same time, and the resending queue in an initial state includes all data packets of the target data. When a network state of the transmission link is good, the plurality of data packets of the target data may arrive at the receiving terminal via the transmission link. After receiving the data packets, the receiving terminal may feed back ACK messages to the sending terminal. After receiving the ACK messages, the sending terminal may delete the corresponding data packets from the resending queue. Here, the ACK message is configured to inform the sending terminal of a last data packet that has been received in sequence. For example, the receiving terminal has received a data packet 5, and if data packets 1-4 have also been received, an ACK message corresponding to the data packet 5 may be fed back at this time. If the data packets 1-3 have been received and the data packet 4 has not been received, the ACK message corresponding to the data packet 3 may be fed back at this time. When a network fluctuation occurs on the transmission link, the data packets of the target data may arrive at the receiving terminal via different transmission links in the network, so that some data packets sent later (i.e. data packets with larger sequence numbers) may have arrived at the receiving terminal earlier. In this way, after receiving a certain data packet out of order, the receiving terminal may feed back to the sending terminal a SACK message corresponding to the data packet and the ACK message of the data packet received in sequence. After receiving the SACK message, the sending terminal may mark the corresponding data packet, and then skip the marked data packet when the target data is resent. Here, the SACK message is configured to inform the sending terminal of data packets that have been received out of order.

The sending terminal may evaluate a disorder degree of the network in advance, and then preset an out-of-order value of the network. After the sending terminal sends the data packets of the target data, the sending terminal may be triggered to resend the target data if the number of SACK messages that correspond to the data packets and that are fed back by the receiving terminal at a certain moment is greater than the preset out-of-order value of the network. Relevant examples are provided to help understanding. The preset out-of-order value of the network is 3, and when the receiving terminal receives data packets 1-3 successively, an ACK message corresponding to the data packet 3 may be fed back. Then, the receiving terminal receives the data packet 5, but has not received the data packet 4, the ACK message corresponding to the data packet 3 and a SACK message corresponding to the data packet 5 are fed back. Then, when the receiving terminal receives data packets 7-9, the SACK message corresponding to the data packet and the ACK message corresponding to the data packet 3 are fed back each time when the receiving terminal receives a data packet. At this time, the number of SACK messages that correspond to the data packets and that are fed back by the receiving terminal is four (the sequence numbers of the data packets are namely, 5, 7, 8 and 9), which is larger than the preset out-of-order value 3 of the network, and thus the sending terminal may be triggered to resend the target data. However, if the data packet 4 is received before the data packet 9, the ACK message corresponding to the data packet 5 and a SACK message corresponding to the data packet 9 may be fed back when the data packet 9 is received. At this time, the number of SACK messages that correspond to the data packets and that are fed back by the receiving terminal is only three (the sequence numbers of the data packets are namely, 7, 8 and 9), so the sending terminal may not be triggered to resend the target data.

After the sending terminal resends a certain data packet (for example, the first data packet) of the target data, the receiving terminal may first receive the first data packet sent for the first time, then feed back the SACK message corresponding to the first data packet if the first data packet previously sent for the first time is not lost. Then, the receiving terminal may further receive the first data packet which is resent, and may feed back to the sending terminal the D-SACK message corresponding to the first data packet. Here, the D-SACK message is configured to inform the sending terminal of data packets that have been repeatedly received. In this way, the sending terminal may receive a D-SACK message corresponding to the first data packet of the target data.

At step 202, an out-of-order value prediction table stored locally is sought for an out-of-order prediction value of the first data packet.

Here, the out-of-order prediction value is the out-of-order value of the network determined according to a reception status of data packets of the target data when the first data packet is resent.

In implementation, the sending terminal may be set with the out-of-order value prediction table for storing the out-of-order prediction values. When the sending terminal resends a data packet of the target data, the out-of-order value of the network may be determined according to the reception status of data packets of the current target data, and then the out-of-order value of the network is taken as an out-of-order value prediction value and is recorded into the out-of-order value prediction table. Detailed processing may refer to the following. In this way, after the sending terminal receives the D-SACK message corresponding to the first data packet of the target data, the out-of-order value prediction table stored locally may be sought for the out-of-order prediction value of the first data packet. If not found, no processing is performed.

At step 203, a current out-of-order value of the network is set according to the out-of-order prediction value of the first data packet.

In implementation, after the sending terminal finds the out-of-order prediction value of the first data packet in the out-of-order value prediction table, the out-of-order prediction value may be compared with the currently set out-of-order value of the network. If the out-of-order prediction value is greater than the currently set out-of-order value of the network, which indicates that the disorder degree of the network becomes serious, then the current network out-of-order prediction value may be directly replaced with the above-described out-of-order prediction value which is found. If the out-of-order prediction value is smaller than the currently set out-of-order value of the network, the processing may not be performed.

Figure 3:
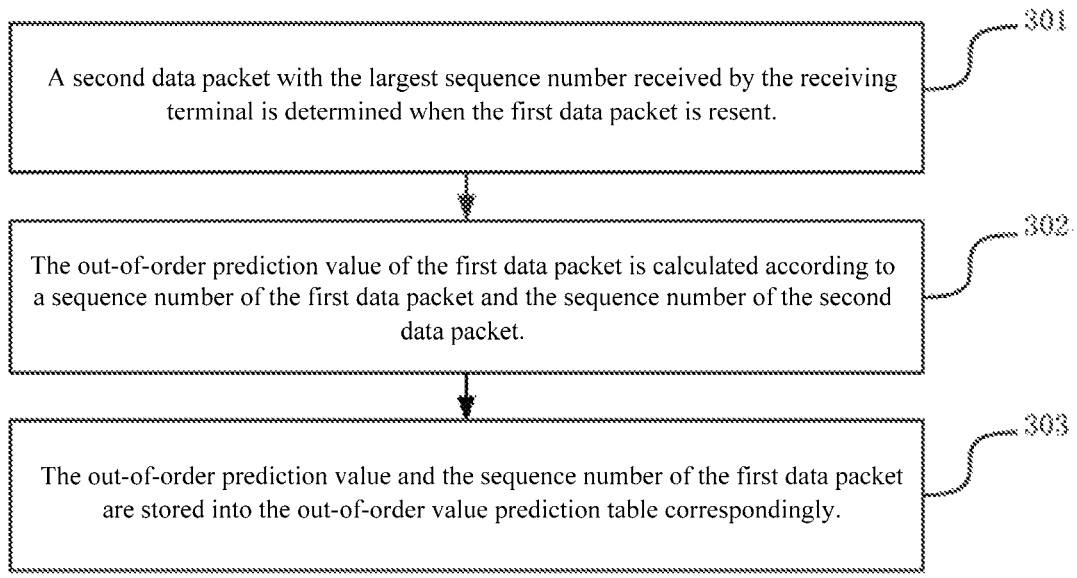
FIG. 3 is another flowchart of a method for setting the out-of-order value of the network in accordance with an embodiment of the present disclosure.

According to some embodiments, this embodiment further discloses a method for storing the out-of-order prediction value. A specific processing may be as shown in FIG. 3:

At step 301, a second data packet with the largest sequence number received by the receiving terminal is determined when the first data packet is resent.

In implementation, in combination with the processing at step 201, the number of SACK messages that correspond to the data packets and that are fed back by the receiving terminal at a certain time is greater than the preset out-of-order value of the network, which may trigger the sending terminal to resend the target data. It is not difficult to understand that when the sending terminal resends the target data, the data packets of the resending queue are sent one by one. When resending the first data packet, the sending terminal may determine the second data packet with the largest sequence number received by a receiving terminal. Specifically, all received SACK messages may be sought for a SACK message corresponding to a data packet with the largest sequence number, and then the data packet corresponding to the SACK message is the second data packet.

At step 302, the out-of-order prediction value of the first data packet is calculated according to a sequence number of the first data packet and the sequence number of the second data packet.

In implementation, after determining the second data packet with the largest sequence number received by the receiving terminal, the sending terminal may add 1 to a difference between the sequence number of the first data packet and the sequence number of the second data packet to obtain the out-of-order prediction value of the first data packet. For example, if the sequence number of the second data packet is 10 and the sequence number of the first data packet is 5, the out-of-order prediction value of the first data packet is 10−5+1=6.

At step 303, the out-of-order prediction value and the sequence number of the first data packet are stored into the out-of-order value prediction table correspondingly.

In implementation, after calculating the out-of-order prediction value of the first data packet, the sending terminal may store the out-of-order prediction value and the sequence number of the first data packet into the out-of-order value prediction table correspondingly.

According to some embodiments, only the out-of-order prediction value of the data packet corresponding to the D-SACK message received with a greater probability may be retained, and a corresponding processing may be as follows: the out-of-order prediction value of the first data packet is deleted from the out-of-order value prediction table if a SACK message or an ACK message corresponding to the first data packet is not received within a preset time period after the first data packet is resent.

In implementation, the sending terminal may start timing after resending the first data packet. If the SACK message or the ACK message corresponding to the first data packet is received within the preset time period, the SACK message or the ACK message fed back by the receiving terminal may be determined not to correspond to the first data packet resent this time, but to correspond to the first data packet sent for the first time received by the receiving terminal within the preset time period. In this way, the sending terminal may be determined to receive the D-SACK message corresponding to the first data packet with a greater probability, and further, the sending terminal may retain the out-of-order prediction value of the first data packet in the out-of-order value prediction table. If the SACK message or the ACK message corresponding to the first data packet is not received within a preset time period, the out-of-order prediction value of the first data packet may be deleted from the out-of-order value prediction table.

According to some embodiments, a useless data in the out-of-order value prediction table may be deleted before the out-of-order prediction value is stored, and a corresponding processing may be as follows: a preset number of out-of-order prediction values stored the longest in the out-of-order value prediction table are deleted if a storage space of the out-of-order value prediction table is full.

In implementation, after the out-of-order prediction value of the first data packet is calculated, whether there is a storage space left in the out-of-order value prediction table may be checked first. If the storage space is full, the preset number of out-of-order prediction values stored the longest may be determined in the out-of-order value prediction table, and then these out-of-order prediction values may be deleted. According to some embodiments, in another case, the preset number of out-of-order prediction values stored the longest may be set to be periodically deleted from the out-of-order value prediction table without waiting for a new out-of-order prediction value. In addition, a valid time period may also be set for each of the out-of-order prediction values. When a certain out-of-order prediction value is stored for a time larger than the valid time period, the out-of-order prediction value is automatically deleted.

According to some embodiments, if there is the same out-of-order prediction value stored already in the out-of-order value prediction table when the out-of-order prediction value obtained through this calculation is stored, two out-of-order prediction values are deleted at the same time. The corresponding processing may be as follows: the out-of-order prediction value and a sequence number of the first data packet are stored into the out-of-order value prediction table if the out-of-order prediction value corresponding to the sequence number of the first data packet is not stored in the out-of-order value prediction table, or both the out-of-order prediction value obtained through this calculation and the out-of-order prediction value corresponding to the sequence number of the first data packet stored already in the out-of-order value prediction table are deleted if the out-of-order prediction value corresponding to the sequence number of the first data packet is stored already in the out-of-order value prediction table.

In implementation, when the out-of-order prediction value of the first data packet obtained through this calculation is stored, the out-of-order prediction value and the sequence number of the first data packet may be directly stored in the out-of-order value prediction table if the out-of-order prediction value corresponding to the sequence number of the first data packet is not stored in the out-of-order value prediction table. If the out-of-order prediction value corresponding to the sequence number of the first data packet has been already stored in the out-of-order value prediction table, it indicates that the sequence number has been rolled back or an error occurs to the sequence number. In this way, it will be difficult to guarantee accuracy of both the out-of-order prediction value in the out-of-order value prediction table and the out-of-order prediction value obtained through this calculation. Therefore, both the out-of-order prediction value obtained through this calculation and the out-of-order prediction value corresponding to the sequence number of the first data packet stored already in the out-of-order value prediction table may be deleted.

In the embodiments of the present disclosure, the D-SACK message corresponding to the first data packet of the target data is received, the out-of-order value prediction table stored locally is sought for the out-of-order prediction value of the first data packet, where the out-of-order prediction value is the out-of-order value of the network determined according to the reception status of data packets of the target data when the first data packet is resent, and a current out-of-order value of the network is set according to the out-of-order prediction value of the first data packet. In this way, the out-of-order prediction value is calculated every time the data packet is resent, and the out-of-order prediction value may be set as the out-of-order value of the network when the D-SACK message is received, so that the out-of-order value of the network may be quickly and accurately updated. On the one hand, resending the data packet falsely may be effectively decreased, and a large amount of network transmission resources may be saved. On the other hand, a situation, in which a transmission efficiency is reduced because of a failure to detect a packet loss in time due to a large out-of-order value of the network, may be avoided.

Figure 4:
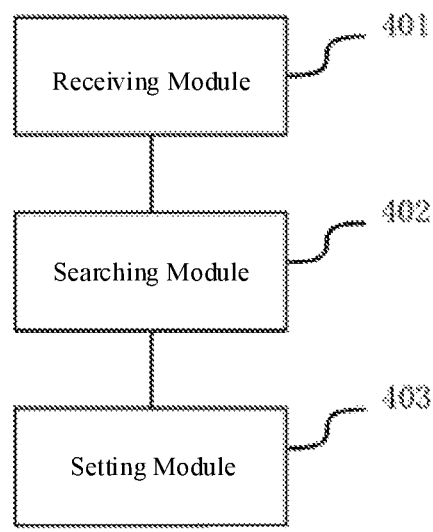
FIG. 4 is a schematic structural diagram of a device for setting an out-of-order value of a network in accordance with an embodiment of the present disclosure.

Based on the same technical concept, an embodiment of the present disclosure further provides a device for setting an out-of-order value of a network. As shown in FIG. 4, the device includes:

a receiving module 401, configured to receive a D-SACK message corresponding to a first data packet of a target data;

a searching module 402, configured to search an out-of-order value prediction table stored locally for an out-of-order prediction value of the first data packet, where the out-of-order prediction value is an out-of-order value of a network determined according to a reception status of data packets of the target data when the first data packet is resent; and a setting module 403, configured to set a current out-of-order value of the network according to the out-of-order prediction value of the first data packet.

Figure 5:
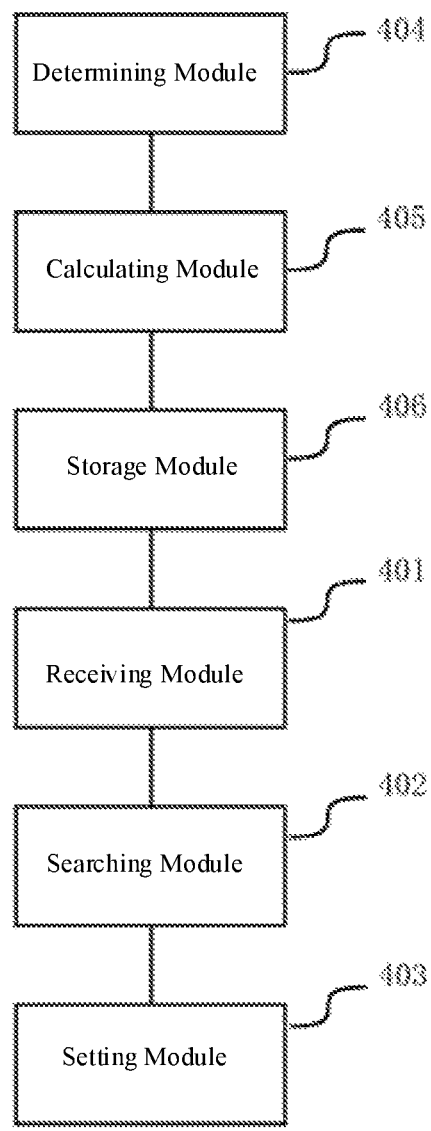
FIG. 5 is another schematic structural diagram of a device for setting the out-of-order value of the network in accordance with an embodiment of the present disclosure.

According to some embodiments, as shown in FIG. 5, the device further includes:

a determining module 404, configured to determine a second data packet with the largest sequence number received by a receiving terminal when the first data packet is resent;

a calculating module 405, configured to calculate the out-of-order prediction value of the first data packet according to a sequence number of the first data packet and the sequence number of the second data packet; and a storage module 406, configured to store the out-of-order prediction value and the sequence number of the first data packet into the out-of-order value prediction table correspondingly.

According to some embodiments, the device further includes:

a first deleting module, configured to delete the out-of-order prediction value of the first data packet in the out-of-order value prediction table if a SACK message or an ACK message corresponding to the first data packet is not received within a preset time period after the first data packet is resent.

According to some embodiments, the device further includes:

a second deleting module, configured to delete a preset number of out-of-order prediction values stored the longest in the out-of-order value prediction table if a storage space of the out-of-order value prediction table is full.

According to some embodiments, the device further includes:

a third deleting module, configured to delete periodically a preset number of the out-of-order prediction values stored the longest in the out-of-order value prediction table.

According to some embodiments, the device further includes:

a fourth deleting module, configured to delete an out-of-order prediction value stored longer than a preset valid time in the out-of-order value prediction table.

According to some embodiments, the storage module 406 is configured to:

store the out-of-order prediction value and the sequence number of the first data packet into the out-of-order value prediction table correspondingly if the out-of-order prediction value corresponding to the sequence number of the first data packet is not stored in the out-of-order value prediction table; and delete both an out-of-order prediction value currently calculated and the out-of-order prediction value corresponding to the sequence number of the first data packet in the out-of-order value prediction table if the out-of-order prediction value corresponding to the sequence number of the first data packet is stored already in the out-of-order value prediction table.

In the embodiments of the present disclosure, the D-SACK message corresponding to the first data packet of the target data is received, the out-of-order value prediction table stored locally is sought for the out-of-order prediction value of the first data packet, where the out-of-order prediction value is the out-of-order value of the network determined according to the reception status of data packets of the target data when the first data packet is resent, and the current out-of-order value of the network is set according to the out-of-order prediction value of the first data packet. In this way, the out-of-order prediction value is calculated every time the data packet is resent, and the out-of-order prediction value may be set as the out-of-order value of the network when the D-SACK message is received, so that the out-of-order value of the network may be quickly and accurately updated. On the one hand, resending the data packet falsely may be effectively decreased, and a large amount of network transmission resources may be saved. On the other hand, a situation, in which a transmission efficiency is reduced because of a failure to detect a packet loss in time due to a large out-of-order value of the network, may be avoided.

It shall be noted that when setting the out-of-order value of the network, the device for setting the out-of-order value of the network in the foregoing embodiments is illustrated by taking the above-described functional modules as an example. In practical applications, the above-described functions may be assigned to different functional modules for completion as needed, that is, an internal structure of the device is divided into different functional modules to complete all or some of the above-described functions. In addition, the device for setting the out-of-order value of the network in the foregoing embodiments is based on the same concept that embodiments of the method for setting the out-of-order value of the network is based on. A specific implementation process of the device embodiment is detailed in the method embodiments and will not be repeated herein.

Based on the same technical concept, an embodiment of the present disclosure further provides a sending terminal which includes a processor and a memory, and the memory stores at least one instruction, at least one program, a code set, or an instruction set, where the at least one instruction, the at least one program, the code set or the instruction set are loaded and executed by the processor to perform the method for setting the out-of-order value of the network as described above.

Based on the same technical concept, an embodiment of the present disclosure further provides a computer-readable storage medium, which stores at least one instruction, at least one program, a code set, or an instruction set, where the at least one instruction, the at least one program, the code set or the instruction set are loaded and executed by a processor to perform the method for setting the out-of-order value of the network as described above.

Figure 6:
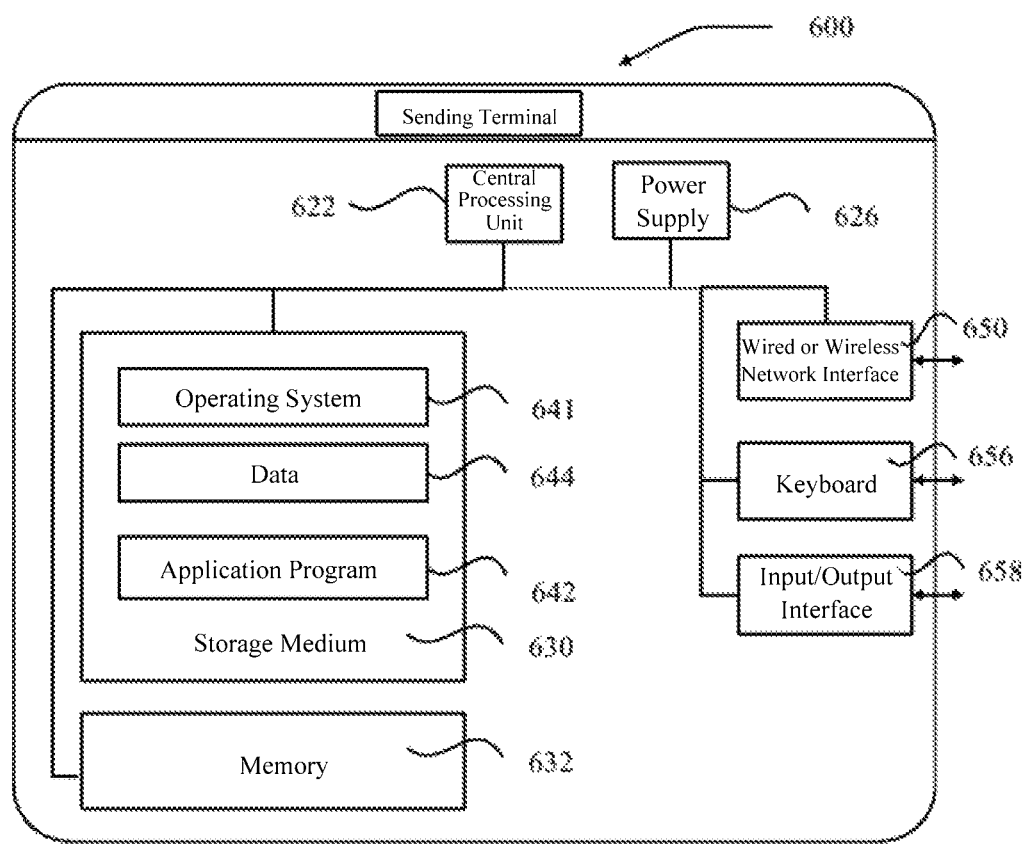
FIG. 6 is a schematic structural diagram of a sending terminal in accordance with an embodiment of the present disclosure.

FIG. 6 is a schematic structural diagram of a sending terminal in accordance with an embodiment of the present disclosure. The sending terminal 600 may have a large difference due to different configurations or performances, and may include one or more central processing units 622 (e.g., one or more processors) and a memory 632, one or more storage medium 630 (e.g., one or more mass storage devices) that store an application program 642 or a data 644. Here, the memory 632 and the storage medium 630 may be transient storage or persistent storage. The program stored in the storage medium 630 may include one or more modules (not shown in the figure), and each module may include a series of instruction operations on the sending terminal. Further, the central processing unit 622 may be configured to communicate with the storage medium 630 and execute the series of instruction operations in the storage medium 630 on the sending terminal 600.

The sending terminal 600 may further include one or more power supplies 626, one or more wired or wireless network interfaces 650, one or more input/output interfaces 658, one or more keyboards 656, and/or one or more operating systems 641, such as Windows Server™, Mac OS X™, Unix™, Linux™, FreeBSD™, and the like.

The sending terminal 600 may include a memory and one or more programs, where the one or more programs are stored in the memory, and the sending terminal 600 is configured to cause one or more processors to execute an instruction that is included in the one or more programs and that is used for setting the out-of-order value of the network as described above.

Those skilled in the art should appreciate that all or some of the steps for implementing the forgoing embodiments may be completed by a hardware, or may also be completed by a program instructing a related hardware. The program may be stored in a computer-readable storage medium which may be a read-only memory, a magnetic disk or an optical disk, and the like.

The above-described are only preferable embodiments of the present disclosure, but are not used to impose a limitation on the present disclosure. Any amendment, equivalent substitution and improvement made within the spirit and principle of the present disclosure shall be included in the protection scope of the present disclosure.

What is claimed is:

1. A method for setting an out-of-order value of a network, comprising:

in response to receiving a Duplicate Selective Acknowledgement (D-SACK) message indicating a first data packet of a target data having been repeatedly received, determining the first data packet, wherein the target data includes a plurality of data packets, and wherein the first data packet is one of the plurality of data packets that has been resent;

searching an out-of-order value prediction table stored locally for an out-of-order prediction value of the first data packet, wherein the out-of-order prediction value of the first data packet has been determined according to a reception status of data packets of the target data and recorded in the out-of-order value prediction table when the first data packet was resent; and in response to the out-of-order prediction value of the first data packet being greater than an out-of-order value currently used in the network, setting the out-of-order prediction value of the first data packet as a new out-of-order value of the network for subsequent sending of one or more data packets of the target data.

2. The method in accordance with claim 1, wherein before receiving the D-SACK message corresponding to the first data packet of the target data, the method further comprises:

resending the target data when a number of Selective Acknowledgement (SACK) messages fed back by a receiving terminal at a certain time is greater than a preset out-of-order value of the network, wherein a SACK message indicates a data packet having been received out of order.

3. The method in accordance with claim 1, further comprising:

determining a second data packet of the plurality of data packets with a largest sequence number received by a receiving terminal when resending the first data packet;

calculating the out-of-order prediction value of the first data packet according to a sequence number of the first data packet and the sequence number of the second data packet; and storing the out-of-order prediction value and the sequence number of the first data packet into the out-of-order value prediction table correspondingly.

4. The method in accordance with claim 3, wherein calculating the out-of-order prediction value of the first data packet according to a sequence number of the first data packet and the sequence number of the second data packet comprises:

adding 1 to a difference between the sequence number of the first data packet and the sequence number of the second data packet to obtain the out-of-order prediction value of the first data packet.

5. The method in accordance with claim 3, after storing the out-of-order prediction value and the sequence number of the first data packet into the out-of-order value prediction table correspondingly, further comprising:
deleting the out-of-order prediction value of the first data packet from the out-of-order value prediction table if a Selective Acknowledgement (SACK) message or an Acknowledgement (ACK) message corresponding to the first data packet is not received within a preset time period after resending the first data packet.

6. The method in accordance with claim 3, after storing the out-of-order prediction value and the sequence number of the first data packet into the out-of-order value prediction table correspondingly, further comprising:
determining a Selective Acknowledgement (SACK) message or an Acknowledgement (ACK) message fed back by the receiving terminal not to correspond to the first data packet currently resent, but to correspond to the first data packet previously sent if the SACK message or the ACK message corresponding to the first data packet is received within a preset time period.

7. The method in accordance with claim 3, before storing the out-of-order prediction value and the sequence number of the first data packet into the out-of-order value prediction table correspondingly, further comprising:
deleting a preset number of out-of-order prediction values stored the longest in the out-of-order value prediction table if a storage space of the out-of-order value prediction table is full.

8. The method in accordance with claim 3, further comprising:
deleting periodically a preset number of out-of-order prediction values stored the longest in the out-of-order value prediction table.

9. The method in accordance with claim 3, further comprising:
deleting an out-of-order prediction value stored longer than a preset valid time in the out-of-order value prediction table.

10. The method in accordance with claim 3, wherein storing the out-of-order prediction value and the sequence number of the first data packet into the out-of-order value prediction table correspondingly comprises:
storing the out-of-order prediction value and the sequence number of the first data packet into the out-of-order value prediction table correspondingly if the out-of-order prediction value corresponding to the sequence number of the first data packet is not stored in the out-of-order value prediction table;
the method further comprising:
deleting both an out-of-order prediction value currently calculated and the out-of-order prediction value corresponding to the sequence number of the first data packet in the out-of-order value prediction table if the out-of-order prediction value corresponding to the sequence number of the first data packet is stored already in the out-of-order value prediction table.

11. A sending terminal, comprising a processor and a memory that stores at least one instruction, at least one program, a code set or an instruction set, wherein the at least one instruction, the at least one program, the code set or the instruction set are loaded and executed by the processor to perform a method for setting an out-of-order value of a network;
wherein the method comprises:

in response to receiving a Duplicate Selective Acknowledgement (D-SACK) message indicating a first data packet of a target data having been repeatedly received, determining the first data packet, wherein the target data includes a plurality of data packets, and wherein the first data packet is one of the plurality of data packets that has been resent;
searching an out-of-order value prediction table stored locally for an out-of-order prediction value of the first data packet, wherein the out-of-order prediction value of the first data packet has been determined according to a reception status of data packets of the target data and recorded in the out-of-order value prediction table when the first data packet was resent; and
in response to the out-of-order prediction value of the first data packet being greater than an out-of-order value currently used in the network, setting the out-of-order prediction value of the first data packet as a new out-of-order value of the network for subsequent sending of one or more data packets of the target data.

12. The sending terminal in accordance with claim 11, further comprising:
determining a second data packet of the plurality of data packets with a largest sequence number received by a receiving terminal when resending the first data packet;
calculating the out-of-order prediction value of the first data packet according to a sequence number of the first data packet and the sequence number of the second data packet; and
storing the out-of-order prediction value and the sequence number of the first data packet into the out-of-order value prediction table correspondingly.

13. The sending terminal in accordance with claim 12, after storing the out-of-order prediction value and the sequence number of the first data packet into the out-of-order value prediction table correspondingly, further comprising:
deleting the out-of-order prediction value of the first data packet from the out-of-order value prediction table if a Selective Acknowledgement (SACK) message or an Acknowledgement (ACK) message corresponding to the first data packet is not received within a preset time period after resending the first data packet.

14. The sending terminal in accordance with claim 12, wherein before storing the out-of-order prediction value and the sequence number of the first data packet into the out-of-order value prediction table correspondingly, the method further comprises:
deleting a preset number of out-of-order prediction values stored the longest in the out-of-order value prediction table if a storage space of the out-of-order value prediction table is full.

15. The sending terminal in accordance with claim 12, wherein the method further comprises:
deleting periodically a preset number of out-of-order prediction values stored the longest in the out-of-order value prediction table.

16. The sending terminal in accordance with claim 12, wherein the method further comprises:
deleting an out-of-order prediction value stored longer than a preset valid time in the out-of-order value prediction table.

17. The sending terminal in accordance with claim 12, wherein storing the out-of-order prediction value and the sequence number of the first data packet into the out-of-order value prediction table correspondingly comprises:

storing the out-of-order prediction value and the sequence number of the first data packet into the out-of-order value prediction table correspondingly if the out-of-order prediction value corresponding to the sequence number of the first data packet is not stored in the out-of-order value prediction table;

the method further comprising:

deleting both an out-of-order prediction value currently calculated and the out-of-order prediction value corresponding to the sequence number of the first data packet in the out-of-order value prediction table if the out-of-order prediction value corresponding to the sequence number of the first data packet is stored already in the out-of-order value prediction table.

18. A non-transitory computer-readable storage medium, storing at least one instruction, at least one program, a code set, or an instruction set, wherein the at least one instruction, the at least one program, the code set or the instruction set are loaded and executed by a processor to perform a method for setting an out-of-order value of a network;

wherein the method comprises:

in response to receiving a Duplicate Selective Acknowledgement (D-SACK) message indicating a first data packet of a target data having been repeatedly received, determining the first data packet, wherein the target data includes a plurality of data packets, and wherein the first data packet is one of the plurality of data packets that has been resent;

searching an out-of-order value prediction table stored locally for an out-of-order prediction value of the first data packet, wherein the out-of-order prediction value of the first data packet has been determined according to a reception status of data packets of the target data and recorded in the out-of-order value prediction table when the first data packet was resent; and in response to the out-of-order prediction value of the first data packet being greater than an out-of-order value currently used in the network, setting the out-of-order prediction value of the first data packet as a new out-of-order value of the network for subsequent sending of one or more data packets of the target data.

* * * * *